US012752609B2

(12) United States Patent
Mimoun

(10) Patent No.: US 12,752,609 B2
(45) Date of Patent: Oct. 6, 2026

(54) ILLUMINABLE LAMINATED GLAZING FOR A VEHICLE AND VEHICLE COMPRISING SUCH A GLAZING

(71) Applicant: SAINT-GOBAIN SEKURIT FRANCE, Thourotte (FR)

(72) Inventor: Emmanuel Mimoun, Aubervilliers (FR)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 0 days.

(21) Appl. No.: 19/124,726

(22) PCT Filed: Oct. 26, 2023

(86) PCT No.: PCT/EP2023/079902

§ 371 (c)(1),
(2) Date: Apr. 25, 2025

(87) PCT Pub. No.: WO2024/089162

PCT Pub. Date: May 2, 2024

(65) Prior Publication Data

US 2026/0175653 A1 Jun. 25, 2026

(30) Foreign Application Priority Data

Oct. 26, 2022 (FR) ....................................... 2211149

(51) Int. Cl.
*B60J 3/04* (2006.01)
*B32B 17/10* (2006.01)
*F21V 8/00* (2006.01)

(52) U.S. Cl.
CPC ........... *B60J 3/04* (2013.01); *B32B 17/10036* (2013.01); *B32B 17/10146* (2013.01);
(Continued)

(58) Field of Classification Search
CPC ...... G02B 6/00; G02B 6/0076; G02B 6/0095; B60Q 1/268; B60Q 3/208; B60J 3/04; B32B 17/10; F21V 8/00
See application file for complete search history.

(56) References Cited

U.S. PATENT DOCUMENTS 10,114,166 B2 * 10/2018 Berard ................. G02B 6/0043
11,953,713 B2 * 4/2024 Pohlen .............. B32B 17/10036
(Continued)

FOREIGN PATENT DOCUMENTS

EP 3 990 981 A1 5/2022
FR 3 015 926 A1 7/2015
(Continued)

OTHER PUBLICATIONS

International Search Report as issued in International Patent Application No. PCT/EP2023/079902, dated Jan. 19, 2024.

*Primary Examiner* — William J Carter
(74) *Attorney, Agent, or Firm* — CUSHMAN PARTNERS LLC

(57) ABSTRACT

An illuminable glazing for a vehicle includes a laminated glazing partially tinted with a minimum refractive index n2 between first and second glass sheets such that n2>n0, n0 being the index of the second glass sheet, a light source coupled to the second glass sheet, light extraction device and, on the fourth main face F4, an optical protection layer of refractive index n1<n2.

20 Claims, 6 Drawing Sheets

(52) U.S. Cl.
CPC .. *B32B 17/10357* (2013.01); *B32B 17/10541* (2013.01); *B32B 17/10761* (2013.01); *G02B 6/0043* (2013.01); *G02B 6/0093* (2013.01); *B32B 2250/03* (2013.01); *B32B 2250/40* (2013.01); *B32B 2255/20* (2013.01); *B32B 2307/584* (2013.01); *B32B 2307/7376* (2023.05); *B32B 2605/00* (2013.01)

(56) References Cited

U.S. PATENT DOCUMENTS

| | | | | |
|---|---|---|---|---|
| 2015/0298601 | A1* | 10/2015 | Bott | B32B 17/10541<br>362/520 |
| 2018/0086028 | A1* | 3/2018 | Berard | B60Q 1/268 |
| 2021/0061163 | A1* | 3/2021 | Black | B32B 17/10005 |

FOREIGN PATENT DOCUMENTS

| | | | | |
|---|---|---|---|---|
| JP | 2018-141891 | A | 9/2018 | |
| WO | WO 2004/025334 | A2 | 3/2004 | |
| WO | WO 2010/049638 | A1 | 5/2010 | |
| WO | WO 2011/092419 | A1 | 8/2011 | |
| WO | WO 2012/025685 | A1 | 3/2012 | |
| WO | WO 2012/172266 | A1 | 12/2012 | |
| WO | WO 2013/017790 | A1 | 2/2013 | |
| WO | WO 2013/175101 | A1 | 11/2013 | |
| WO | WO 2015/079159 | A1 | 6/2015 | |
| WO | WO 2016/156721 | A1 | 10/2016 | |
| WO | WO-2018178591 | A1 * | 10/2018 | B60Q 3/208 |
| WO | WO 2020/263929 | A1 | 12/2020 | |

* cited by examiner

Fig.1"
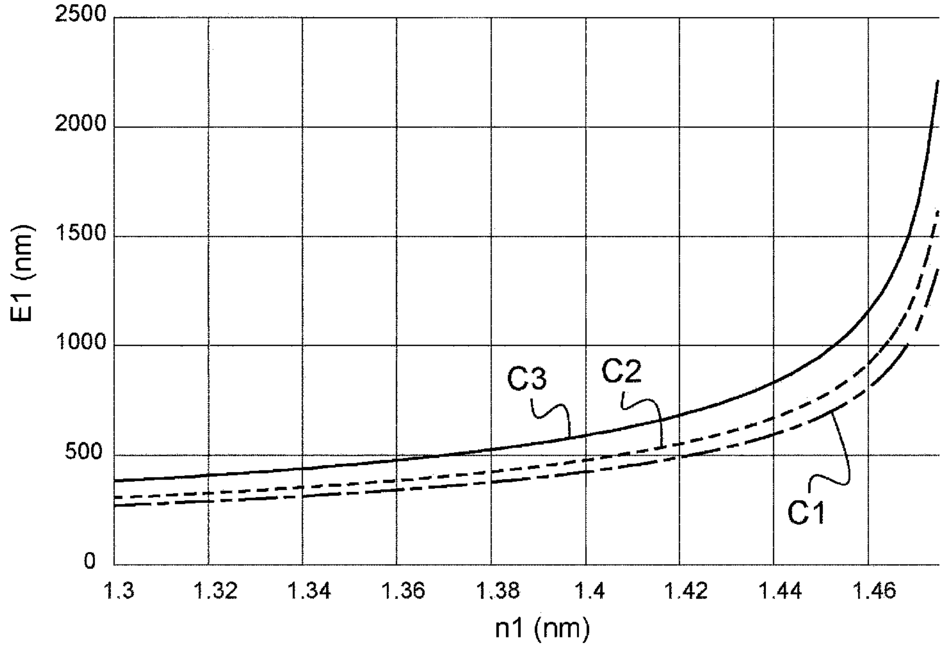
Fig.2
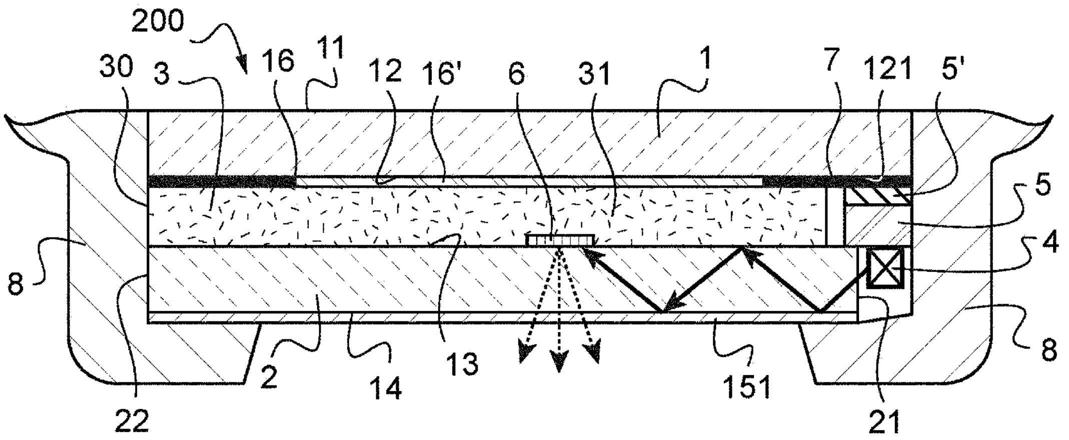

ILLUMINABLE LAMINATED GLAZING FOR A VEHICLE AND VEHICLE COMPRISING SUCH A GLAZING

CROSS-REFERENCE TO RELATED APPLICATIONS

This application is the U.S. National Stage of PCT/EP2023/079902, filed Oct. 26, 2023, which in turn claims priority to French patent application number 2211149 filed Oct. 26, 2022. The content of these applications are incorporated herein by reference in their entirety.

The present invention relates to an illuminable laminated glazing for a vehicle, particularly a vehicle glazing with light-emitting diodes.

Light-emitting diodes (LEDs) have been used for a number of years to illuminate signaling devices (traffic lights, etc.), turn signals or position lights of motor vehicles. The advantages of diodes are their long service life, their luminous efficacy, their reliability, their low energy consumption and their compactness, making the equipment that uses them even more durable and requiring less maintenance.

More recently, light-emitting diodes have been used for motor vehicle roofs, particularly panoramic laminated roofs illuminated by light-emitting diodes, as described in document WO2010049638. The light emitted by the diodes is introduced via the edge face into the inner glazing forming a guide, with the light being extracted from the glazing by a scattering layer on the glazing, the surface of which defines the luminous design, such as a flat enamel containing dielectric scattering particles.

It is also possible to improve the light rendering in the illuminated roof or, more generally, in an illuminating glazing, in particular by improving the perception of the luminous design.

To this end, the present invention relates to an illuminable (or luminous) laminated glazing for a vehicle, in particular a road vehicle (car, truck, public transport: bus, coach, etc.) or a rail vehicle (train, metro, tramway), preferably curved, preferably a roof or even a side window (including a rear window), a (rear) door window, a windshield, or even a rear window, comprising:

- a first transparent (curved) sheet of mineral glass, optionally tinted (colored in the bulk), in particular gray or green, the first (transparent) glass sheet having a first main outer face, referred to as face F1, a second main inner face, referred to as face F2 (bare or coated with a functional-transparent-coating, in particular of at most 200 nm), typically with refractive index nv of at least 1.5 and even of at most 1.6 or 1.55, in the visible range (at a reference wavelength chosen in particular from 550 nm to 600 nm, for example 550 nm, which is preferably in the spectral range of the light source mounted or to be mounted)
- a second transparent (curved) sheet, made of glass, preferably mineral or organic, in particular clear glass or preferably extra-clear glass, in particular with a thickness of no more than 2.1 mm, with a third main face referred to as face F3 and a fourth main face referred to as face F4 (facing the interior of the vehicle), which second sheet has a refractive index n0, in particular of at least 1.5 and possibly at most 1.6 or 1.55, in the visible range, in particular at a reference wavelength chosen in particular from 550 nm to 600 nm, for example 550 nm, which is preferably in the spectral range of the light source (mounted or to be mounted)
- between faces F2 and F3 (and even in contact with the preferably bare face F3 and/or with the bare or coated face F2), one or more intermediate layers (for example at most 10, 5, 4, 3, or 2 intermediate layers), dielectric, transparent, of given refractive indices in the visible range (at the reference wavelength), comprising a polymer laminate interlayer (with one or more interlayers), in particular the intermediate layer(s) are the interlayer(s), or mostly the interlayer(s), preferably with a (lower) interlayer in contact with the bare face F3 and with an (upper) interlayer in contact with the bare or coated face F2, or with a single interlayer in contact with the bare face F3 and in contact with the bare or coated face F2,
- the first sheet being tinted and/or among the intermediate layer(s) a first layer being tinted, in particular a first tinted interlayer (in particular based on PVB), in particular in contact with the bare or coated face F2
- when several intermediate layers, interlayers (in particular a PVB-based interlayer), are tinted, the first tinted layer is the tinted layer closest to face F3, n2 being the lowest refractive index in the visible range among the refractive indices of the intermediate layer(s) (in particular interlayer) between face F3 and up to and including the first tinted layer or up to face F2 in the absence of a tinted intermediate layer, with $n2<n0$, in particular at the reference wavelength, and preferably $n2<n0$ for the entire spectral range, and typically $n2<nv$ (in particular if second sheet is made of mineral glass).

The glazing according to the invention further preferably comprises a light source (preferably polychromatic, with a wide spectral range of at least 100 nm, particularly white) optically coupled with the second sheet forming a light guide. In particular, the light source (preferably diodes) is peripheral, preferably offset from the clear glass area. The light source can be removable, added, sold separately or in a kit. The light source can extend linearly (diode array(s)).

The glazing according to the invention further comprises means for extracting (guided) light, light guided in the second sheet (light extraction means linked to the second sheet, in optical or even direct contact with face F3 or face F4 or in the second sheet).

The glazing according to the invention further preferably comprises a light source (preferably polychromatic) optically coupled with the second sheet forming a light guide, in particular a peripheral light source, preferably offset from the glass, preferably diodes). The light source can be removable, added, sold separately or in a kit. The source can extend linearly.

The glazing further comprises means for extracting light, light guided in the second sheet (light extraction means linked to the first sheet, in optical or even direct contact with face F3 or face F4 or in the second sheet).

Additionally, the glazing comprises, on face F4, a transparent dielectric insulating optical protection layer with refractive index n1 in the visible range, with $n1<n2$, in particular at the reference wavelength, and even for the entire spectral range of the source (in particular a polychromatic source, for example RGB or white light) and with a thickness E1 of at least 100 nm or even at least 200 nm and submillimeter, and preferably of at most 100 μm or 50 μm or 5 μm or 1 μm or 500 nm.

With the prior art roof architecture, any contamination of face F4 is a cause of light extraction and is therefore highly visible when the light is switched on, as light bounces off face F4, where it can interact with fingerprints or dust.

According to the invention, the optical protection layer isolates face F4 in the open air (tin face for float glass, for example) from any contamination that might come into contact therewith. This optical protection layer makes the light guide insensitive to surface contamination, without loss of light extraction efficiency.

The optical protection layer is effective, owing to its transparency, dielectric properties and choice of refractive index n1, with a reasonable thickness E1. Depending on the materials available and the integration of the optical protection layer, E1 is lowered to a greater or lesser extent, and n2 is approached to a greater or lesser extent.

In particular, its index n2 and thickness E1 are adjusted to allow only an evanescent wave at the angles of incidence of the guided mode (beyond the critical angle).

The optical protection layer is in optical contact with face F4, on a functional sub-layer (barrier, etc.), notably mineral, for example of at most 120 nm or 100 nm, for example with a refractive index greater than n2 (and n1) in the visible range, notably at the reference wavelength.

For simplicity, the optical protection layer (in particular a coating) can be in direct contact with face F4 (deposited directly on face F4).

The optical protection layer (film or coating) can preferably have a light absorption of no more than 3%, even 1% in the visible range (at the reference wavelength or even over the entire visible range).

The outer edge face of the optical protection layer can be offset from the clear glass area, for example defined by a peripheral internal masking layer (forming a peripheral masking frame) between face F2 and face F3, with the optical protection layer in particular extending under this internal masking layer (in particular enamel, for example black) by a maximum of 10 cm or a maximum of 3 cm.

A reference wavelength of 550 nm can be chosen for all refractive indices according to the invention, and even according to DIN 67507. Preferably, the relationships between refractive indices n1<n2 and n0>n2 are true for the entire visible spectral range of the light source, for the whole visible range.

The Applicant has identified that the absorption of visible light by a contaminating layer is non-negligible. However, the absorption of visible light at normal incidence remains low, as the light passes through it perpendicularly. The interaction between the radiation and the contaminating layer takes place only on the thickness ef of the contaminating layer.

However, the situation is different for light in the guided mode, with contaminating layer directly on face F4 of the light guide, as the guided light is likely to interact with the contaminating layer. The rays of the guided mode are "grazing", propagating along a θ of incidence, for example, greater than around 78° in the configuration with a lower interlayer based on polyvinyl butyral (PVB) and a second sheet of mineral glass.

Thus, a significant proportion of the guided light coming into contact with this contaminating layer is at a grazing angle and is therefore likely to be absorbed.

A guided mode ray therefore passes through the contaminating layer over a distance corresponding to: ef/cos (0). The steeper the angle, the lower the cos (0), the greater the distance over which the guided mode rays interact with the contaminating layer, and therefore the greater the proportion of absorbed rays.

This is why, depending on the light injected by the source into the guide, there may be an alteration, a chromatic change, a reduction or even an erasure of the luminous zone resulting from the extraction as one moves away from the point of light injection due to the high guided mode absorption of the contaminating layer at grazing angles.

To preserve the luminous zone, the inventors therefore chose the optical protection layer with lower absorption and therefore better preservation of the guided mode in terms of its total intensity.

The optical protection layer is effective, owing to its transparency, dielectric properties and choice of refractive index n1, with a reasonable thickness E1. Depending on the materials available and the integration of the optical protection layer, E1 is lowered to a greater or lesser extent, and n2 is approached to a greater or lesser extent.

In particular, its index n1 and thickness E1 are adjusted to allow only an evanescent wave at the angles of incidence of the guided mode (beyond the critical angle).

The thickness of the tinted material limits heating inside the passenger compartment. A tinted intermediate layer (interlayer or an added polymer tinted film, for example first tinted layer, optionally a single layer) preferably extends over almost the entire glazing, in particular at least 80% or 90%. Molecular dyes or inorganic pigments can be used to tint an intermediate layer (in particular an interlayer or said polymer film).

A tinted intermediate layer (interlayer, top and/or bottom layer, said tinted film, for example first tinted layer, optionally a single layer) can have a light transmission of at most 50% or 40% or 30% or 20% and even at least 5%. A different color shade can be chosen, identical to that of the first sheet of glass. For example, the first sheet of tinted glass is green, blue or grey and the first tinted layer, preferably an interlayer (for example PVB), is blue or grey. At least one other intermediate layer, preferably a clear interlayer (for example clear PVB), can be added closer to face F2 than the first tinted layer or closer to face F3.

The invention takes advantage of this thickness of tinted material. In fact, while the most grazing rays are guided into the second sheet by total internal reflection at the interface with the intermediate layer (lower interlayer, for example), other, less grazing rays, propagating through the glazing by refraction, reach the tinted material and are rapidly absorbed after a few bounces (refraction and reflection). They are therefore rapidly absent on face F4, for example after less than 10 cm from the injection zone.

In particular, the first glass sheet and/or any tinted intermediate layer (PVB or non-adhesive interlayer such as polyethylene terephthalate, PET) are sufficiently absorbent (taking into account their absorption coefficients and thicknesses) so that on rebound (refraction from face F3 to face F1, then reflection on face F1, refraction back to face F3, the light intensity is reduced by at least 50%. Light intensity can be measured by transmission spectroscopy. Typically, the extinction coefficient k, the imaginary part of the complex refractive index for a 2 mm VG10 glass from the Applicant (or for a 0.76 mm tinted PVB with a 40% TL) is of the order of 10-8 in the visible range (particularly at the reference wavelength, for example 550 nm, and even over the spectral range of the source).

The tinted thickness thus creates an angular filter that eliminates the need to deal with less grazing angles. In this zone close to the injection, the glazing can be masked (trim), for example in favor of a peripheral masking layer as described later).

The single- or multi-layer laminating interlayer is at most 2 cm or 1.2 cm thick or subcentimetric, in particular at least 0.3 mm thick, in particular all or part thermoplastic (colored or not), with, for example, at least one lower part of the lamination interlayer (colored or not) known as the lower interlayer (for example a lamina), preferably at least 100 μm thick, in adhesive contact with face F3.

The glazing according to the invention is thus tinted (that is, absorbing visible light, particularly in the spectral range of the light source) over a given thickness of, for example, at least 100 μm or 300 μm:

- the first sheet is tinted (colored in the bulk over its entire thickness)
- and/or on all or part of the laminated interlayer, preferably in sub-millimeter tinted thickness, for example an upper interlayer, between face F2 and the lower interlayer, being tinted (colored in the bulk) and/or the lower interlayer being tinted
- and/or or a transparent, tinted (colored in the bulk), polymeric film (in particular non-adhesive to mineral and/or organic glass), for example with a thickness of at least 30 or 50 μm and better still at most 200 μm, being inserted between face F2 and the lower interlayer, for example within the laminating interlayer, between the lower interlayer and an upper interlayer.

For example, this is a thermoplastic film (flexible, curved according to the curvature of the glazing), which is: polyester, in particular polyethylene terephthalate (PET), polybutylene terephthalate PBT, poly(ethylene naphthalate) (PEN), polyimide (PI), polyurethane (PU) or cellulose triacetate (TAC), acrylic, polyolefin, in particular polypropylene (PP), polycarbonate (PC) or PMMA, (coextruded) film made of PET-PMMA poly(vinyl chloride) PVC.

With a polymer film made of PC or PMMA, thermoplastic polyurethane (TPU) is preferred (for more chemical compatibility) as a thermoplastic interlayer. Similarly, if a second sheet of organic PC or PMMA glass is chosen, the preferred thermoplastic interlayer (especially the lower one) is thermoplastic polyurethane (TPU).

The laminating interlayer (an upper interlayer in particular) may have a main face FA in adhesive contact with the bare face F2 or with a functional coating on face F2. The interlayer (the lower interlayer) can have a main face FB in adhesive contact with the bare face F3 (face FB of the lower interlayer).

Advantageously, the difference n2–n1 is greater than 0.02 or even 0.05 and/or the difference n2–n1 is preferably less than 0.3 and even 0.15 or 0.1 (for example at 550 nm).

Unexpectedly, given the angular filtering, it is not necessary to lower n1 to 1 or as close to 1 as possible, which would drastically restrict the choice of material. The index n1 can be slightly lower than n2 (in particular that of an interlayer) to isolate all the light propagating in the second sheet.

If n1 is too close to n2, the thickness E1 must be further increased, which can sometimes be detrimental to the mechanical strength of the optical protection layer (appearance of micro-cracks, etc.).

It may be desirable to have an n1 a little further away from n2 and to increase the thickness E1, for example for an optical protection layer or a liquid organic coating. In the case of a porous layer, such as silica, the degree of porosity required is reduced.

Preferably, for example at 550 nm, n1 is greater than or equal to 1.3 or even 1.35 or 1.4 (n2 is notably at least 1.45 or 1.48) and n0 is at least 1.5. E1 is preferably at least 250 nm. In particular, at 550 nm, n2=1.485 approximately (and even the lower interlayer is preferably PVB-based), and no is at most 1.53.

To characterize absorption by the contamination layer of light in the guided mode, it is not possible to determine parameters experimentally, since the guided mode exists only in the second sheet.

Moreover, the nature of the contaminating layer cannot be prejudged in advance, so the pessimistic assumption is made of a layer absorbing 100% of light. With this system, the Applicant has determined a specific optical model enabling guided-mode reflection to be evaluated by simulation, in particular the guided-mode parameter called Rgm, which is the total amount of light reflected at each reflection on the layered interface. This reflection corresponds to a given angle of incidence (for example 80° above the critical angle of 78° if the second sheet of mineral glass and the lower PVB layer are used, according to the Snell-Descartes law with n0=1.52±0.01, n2=1.485±0.05 at 550 nm). Strong absorption in guided mode results in limited Rgm values.

The inventors then determined an optical protection layer such that even in the presence of a layer absorbing 100% of the light behind it, the latter has a higher Rgm parameter, preferably of at least 95% or even 97% or even 99%, denoting very low absorption and therefore better preservation of the guided mode in the sense of its total intensity.

Thus, E1 and n1 are chosen such that the optical protection layer has an Rgm parameter which is the guided mode reflection at the second interface between the sheet and the optical protection layer of at least 95%, preferably at least 97% and even at least 99%.

In one embodiment, simulations of this system with a 100% absorbing layer were carried out and validated with n=1.52, n2=1.485 at 550 nm.

Particularly for Rgm of 95%, the thickness E1, in nm, is in a first delimited region of a graph of thickness E1 based on n1, with a first included lower limit E1a defined by a first curve C1 of thickness based on n1 of the following equation:

$$E1a(n1) = b1 - a_{11} * (n1 - n_{r1}) - a_{31} * (n1 - n_{r1})^3 - a_{51} * (n1 - n_{r1})^5$$

with $n_{r1}$=1.499; b1=122 nm; $a_{11}$=30.1 nm; $a_{31}$=−9.44*$10^{-3}$ nm; $a_{51}$=5.69*$10^{-6}$ nm This curve has a vertical asymptote close to n2.

And preferably, in particular for Rgm of 97%, the thickness E1, in nm, is in a second delimited region of said graph (more restricted than the first region), with a second included lower limit E1b, defined by a second curve C2 (above C1) of the thickness based on n1 of the following equation:

$$E1b(n1) = b2 - a_{12} * (n1 - n_{r2}) - a_{32} * (n1 - n_r) - a_{52} * (n1 - n_{r2})^5$$

with $n_{r2}$=1.495; b2=154 nm; $a_{12}$=30.5 nm, $a_{32}$=−7.51*$10^{-3}$ nm; $a_{52}$=3.05*$10^{-6}$ nm And even more preferentially, in particular for Rgm of 99%, the thickness E1, in nm, is in a third delimited region of said graph (more restricted than the first or second region), with a third included lower limit E1c, defined by a third curve C3 (above C1 and C2) of the thickness based on n1 of the following equation:

$$E1c(n1) = b3 - a_{13} * (n1 - n_{r3}) - a_{33} * (n1 - n_{r3})^3 - a_{53} * (n1 - n_{r3})^5$$

With $n_{r3}$=1.492; b3=211 nm; $a_{13}$=34.4 nm; $a_{33}$=−6.43*$10^{-3}$ nm; $a_{53}$=1.99*$10^{-6}$ nm.

And E1 is preferably no more than 3 μm or even no more than 1.5 μm.

If E1 of at most 1 μm is preferred, n1 of at least 1.466, 1.4685, 1.453, respectively, is needed. If E1 of at most 800 nm is preferred, n1 of at least 1.461, 1.453, 1.438, respectively, is needed. If E1 of at most 600 nm is preferred, n1 of at least 1.442, 1.43, 1.40, respectively, is needed. If the thickness E1 can be at least 1.2 μm (self-supporting film, liquid coating), n1 can be at least 1.472, 1.470, 1.461.

Above 1.3 μm, 1.6 μm, 2.2 μm, respectively, n1 is in the widest possible range as long as n1<n2.

The optical protection layer can be a so-called protective coating, preferably a single layer, on face F4 (preferably in direct contact).

The minimum E1 depends on the material type and deposition method.

For example, the thickness E1 is expected to be at least 300 nm, 400 nm, 500 nm, 800 nm and preferably at most 5 μm or 3 μm or even at most 1.5 μm.

The protective coating can be deposited on the second flat glass sheet prior to the tempering bending operation (and must therefore be temperable). Alternatively, the optical protective coating can be deposited (preferably by liquid means) on the second curved glass sheet, particularly if an organic protective coating is used. Typically, the tempering bending operation is carried out at a temperature of at least 600° C.

The protective coating can be applied after lamination, particularly if adhesive protective coating with a carrier element for example A tempered glass.

The protective coating can be mineral, and on the second glass sheet preferably mineral, preferably silica-based coating (dense or preferably porous), in particular sol-gel with E1 at most 1.5 or 1 μm. Preferably, the second glass sheet is mineral in the case of sol gel deposition involving removal of pore-forming agent by heat treatment (for example during tempering and bending).

The protective coating comprises (in particular consists of) preferably:

- a sol-gel layer based on porous silica and E1 is at most 1 μm, better still at most 800 nm and even 700 nm, in order to avoid the risk of cracks, n1 can readily go up to 1.3
- or a layer based on oxide (silica-based, etc.) deposited by physical vapor deposition (PVD) such as magnetron sputtering, and E1 is at most 1 μm, better still at most 700 nm and even 400 nm, since the deposition is very slow,
- or a porous silica-based layer obtained from a SiOxCyHz layer deposited by a combination of plasma-enhanced chemical vapor deposition (PECVD) and magnetron sputtering, with E1 preferably at most 500 nm, and after (bending)—tempering becoming (more) porous silica, for example method for depositing such a layer disclosed in patent application WO2012172266.

With magnetron sputtering, the silica layer can contain one or other elements such as aluminum and the refractive index may be 1.48.

The proportion by volume of pores may be limited and controlled in particular by the sol-gel process.

The protective coating can comprise (consist of) a layer based on porous silica, in particular sol-gel, in particular n1 is at most 1.44, optionally with an underlayer of dense silica, in particular sol-gel, with a refractive index greater than n1 (for example at least 0.02 or 0.05) of 1.45. This underlayer preferably has a thickness of at least 5 nm, in particular of at most 120 nm, for example between 50 nm or 80 nm and 120 nm.

The protective coating may comprise (consist of) a porous silica-based layer, in particular sol-gel, with a porosity of less than 20% or 10% by volume, in particular n1 is at least 1.4 or 1.42 or 1.44.

The structuring of the sol-gel layer in pores is linked to the sol-gel type synthesis technique, which makes it possible to condense the essentially mineral (that is, mineral or hybrid organic) material with a pore-forming agent suitably chosen in particular of size(s) and/or of well-defined shape(s) (elongated, spherical, oval, etc.). The pores can preferably be empty or optionally filled.

It is thus possible to choose silica prepared from tetraethoxysilane (TEOS),

The refractive index can be adjusted to suit the pore volume. The following relationship can be used as a first approximation for calculating the index n1:

$n1=f\cdot n_{a+}(1-f)\cdot n_{pores}$ where f is the volume fraction of the material making up the layer (here silica) and $n_a$ is its refractive index (here silica) and $n_{pores}$ is the pore index, generally equal to 1 if empty.

The thickness of the optical protective layer can also be adjusted by selecting the appropriate solvent ratio.

The pores can be closed, by removing a particulate pore-forming agent.

The smallest characteristic dimension of the pores (and preferably the largest) can be greater than or equal to 30 nm and preferably less than 200 or 100 nm or even 80 nm, and less than E1. The porosity can further be monodisperse in size.

The optical protective layer, in particular a coating, preferably a single layer, may comprise (consist of) an organic or inorganic-organic hybrid layer, in particular an acrylate or polymethacrylate layer (varnish, etc.).

It may optionally be in contact with a film, for example glass, up to 600 μm thick, then bonded to face F4.

E1 is, for example, at most 50 μm or 10 μm or 5 μm (micronic), or even at most 800 nm or 700 nm. The high and/or low limit may depend on the deposition method.

For simplicity's sake, it is preferred for the optical protection layer (protective coating) to be single-layer and on face F4.

An inorganic-organic hybrid sol-gel layer may be based on methyltriethoxysilane (MTEOS), an organosilane with a non-reactive organic group. MTEOS is an organosilane with three hydrolyzable groups and a non-reactive methyl organic moiety.

Even if an optical protection layer in the form of a coating on face F4 is preferred (for its simplicity and compactness), it is possible to envisage other embodiments of the invention.

Alternatively, a (thermoplastic) fluoropolymer optical protection film can be bonded to face F4 and joined to a transparent film (polymer or preferably clear or extra-clear glass, especially ultra-thin glass, or 'UTG', of no more than 600 μm or 300 μm. The fluoropolymer film may be based on or even made from one of the following materials:

- perfluoroalkoxy PFA, in particular with n1 of about 1.3
- polyvinylidene fluoride PVDF, in particular with n1 of about 1.4
- ethylene chlorotrifluoroethylene ECTFE
- ethylene tetrafluoroethylene ETFE, more specifically poly (ethylene-co-tetrafluoroethylene, in particular with n1 of about 1.4 ethylene perfluorinated propylene copolymer FEP or (Fluorinated Ethylene Propylene), in particular with n1 of about 1.3 polytetrafluoroethylene PTFE with n1 of about 1.3, polyvinyl fluoride (PVF).

In one configuration, the optical protection layer, preferably a single layer, can comprise an adhesive layer of cross-linked polymeric material (film or coating) on face F4 (preferably in direct contact) and in contact with a main inner face Fi of a transparent film (polymer or preferably clear or extra-clear glass, notably ultra-thin glass, or 'UTG', of at most 600 μm or 300 μm). Glass is preferred for its mechanical durability.

The optical protection layer can be an optical adhesive (OCA for optically clear adhesive, LOCA if liquid).

For the manufacture of the optical protection layer, cross-linkable adhesives which cure when their components react (especially under ultraviolet, thermo-crosslinkable, etc.) or when a solvent evaporates can be used. In all cases, there is a chemical reaction in order to create chemical bonds for the crosslinking, in which case the crosslinked polymer is defined by the formation of a 3D network of polymer chains bound by chemical bonds.

Thus, the way in which the crosslinkable adhesive cures depends on its nature, with some (photo) crosslinking particularly by energy supply of the ultraviolet (UVA) or visible range (400-405 nm) type, and others crosslinking at ambient temperature with the addition of a curing agent by chemical reaction. Other crosslinkable adhesives are crosslinked by chemical reaction initiated and favored owing to the supply of thermal energy.

Liquid deposition of the crosslinkable adhesive can be done by spray coating, curtain coating, flow coating, roller coating, slot die, dip coating or casting, blade coating, screen printing, inkjet, drop casting, or by filling a cavity with a syringe in particular.

Preferably, the optical protection layer can be ultraviolet photocrosslinked, for example comprising an ultraviolet photocrosslinked polymer matrix.

In one configuration, the optical protection layer, preferably a single layer, comprises (is) in particular:

an adhesive film, preferably at least 30 μm thick (easier to handle, less risk of wrinkling) and preferably at most 100 μm or 50 μm pressure-sensitive film, preferably chosen from acrylate-, urethane acrylate- or fluoro urethane acrylate- or silicone-based polymers or an adhesive coating, preferably with a thickness of at least 800 nm or 1 μm, or even at least 10 μm.

In one embodiment, the optical protection layer is a cross-linked polymer-based adhesive film, in particular of at least 30 μm, preferably a pressure-sensitive film, preferably selected from acrylate-, urethane acrylate- or fluoro urethane acrylate- or silicone-based polymers.

The cross-linked polymeric material of the adhesive optical protection layer is, for example, selected from polymers based on polyacrylate, in particular urethane acrylate or fluoro urethane acrylate or fluoro silicone acrylate, polysiloxanes, silicone, in particular polydimethylsiloxane, epoxy polymer or polyepoxides, polyurethane, polyvinyl acetate, polyester. In particular, the crosslinked polymer material of the adhesive optical protection layer is preferably chosen from an acrylate-based polymer, in particular urethane acrylate or silicone acrylate or silicone-based, and the polymer further having a fluorinated function One example is a cross-linkable liquid (UV) adhesive for liquid deposition:

adhesive based on urethane acrylate, for example from Norland, in particular the product called LOCA Norland NOA 1315 (n1=1.315), which is an aliphatic urethane acrylate, adhesive based on fluoro urethane acrylate, for example from Shin-A, in particular the product called SFA 335 (n1=1.335-1.339) or SFA 387 (n1=1.385-1.389), adhesive based on acrylate, for example, in particular the product called UZ181A (n1=1.47) from AKChemTeck, or else the product called UVEKOL S15 (n1=1.44) from Allnex.

Mention may be made of liquid adhesives based on fluoro urethane acrylate, for example from Shin-A, in particular the product called LOCA Shin-A 335 (n1=1.335-1.339) or 387 (n1=1.385-1.389).

In particular, the pressure sensitive adhesive (PSA) bonds by contact after application of a mechanical pressure.

As acrylate-based low-index PSA film, mention may be made of the product CS986 (refractive index 1.47) from Nitto.

As silicone-based low-index PSA film, mention may be made of the product called Opt Alpha Gel from Taica (n1=1.41).

Regarding the silicone, polydimethylsiloxane (PDMS) or dimethicone, which is an organometallic polymer of the family of siloxanes, is preferred.

A pressure-sensitive adhesive, abbreviated to PSA and commonly called self-adhesive, is an adhesive which forms a bond when a pressure is applied to it, so as to render the adhesive integral with the surface to be adhesively bonded. No solvent or water or heat is necessary to activate the adhesive.

As its name shows it to be "pressure-sensitive," the degree of bonding between a given surface and the self-adhesive binder is influenced by the amount of pressure used to apply the adhesive to the target surface and the nature and density of the physical bonds formed between the adhesive and the substrate (mineral or organic glass sheet).

PSAs are generally designed to form a bond and to maintain the latter at ambient temperature.

PSAs may be made of rubber, polyurethane, acrylic ester polymer, polysiloxane.

PSAs are generally based on elastomer coupled with an appropriate additional adhesive agent or "tackifying" agent (for example an ester resin). The elastomers can preferably be based:

on acrylates, which may be sufficiently tacky not to require an additional tackifying agent.

on silicone, requiring special tackifying agents such as "MQ"-type silicate resins, composed of monofunctional ("M") trimethylsilane which has reacted with quadrifunctional ("Q") silicon tetrachloride, silicone-based PSAs are for example gums and resins of polydimethylsiloxane dispersed in xylene or a mixture of xylene and toluene or optionally:

on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers, on vinyl ethers.

on nitriles.

PSA adhesives are sold in the form of double-sided adhesive rolls with a liner on each face to protect the PSA film.

Mention may be made, as silicone-based PSAs, of Dow Corning® adhesives, such as 2013 Adhesive, 7657 Adhesive, Q2-7735 Adhesa, Q2-7406 Adhesive, Q2-7566 Adhesive, 7355 Adhesive, 7358 Adhesive, 280A Adhesive, 282 Adhesive, 7651 Adhesive, 7652 Adhesive, 7356 Adhesive or Taica adhesives such as OPT alpha GEL® such as K120E, K90E or MRK adhesives such as MR3050, MR3080.

Mention may be made, as acrylate-based PSAs, of Nitto adhesives such as CS98210U, CS98210UK or Tesa® adhesives such as OCA 69206, OCA 69208, OCA 69405.

The glazing according to the invention, in particular the roof, can comprise, between faces F2 and F3, an electrically controllable device with a stack (dielectric support)/electrode/active layer/electrode/(dielectric support) for example between two laminae (or interlayers) of the lamination interlayer (PVB, etc). The following electrically controllable devices are available:

- variable haze device: a liquid crystal device (PDLC, PNLC, CLC, liquid crystal cell), with a stack (dielectric support)/electrode (/alignment layer)//active layer/electrode (/alignment layer)/(dielectric support) for example between two laminae (or interlayers) of the lamination interlayer (PVB, etc.),
- variable-tint device: an electrochromic device, for example, or a suspended particle device (SPD).

The thickness of the active layer can range from 1 to 20 μm, and even 5 to 15 μm.

One or more transparent supports are for example flexible and polymeric, for example up to 200 μm, or glass, for example up to 400 μm.

Each support is provided with an electrode (transparent layer, for example conductive metal oxide or silver stack) and optionally an alignment layer, in particular for planar or homeotropic anchoring.

Examples of liquid crystal devices include polymer-dispersed liquid crystal (PDLC) systems (where the liquid crystals are dispersed in a polymer matrix), or Cholesteric Liquid Crystal (CLC) systems, or Polymer Network Liquid Crystal (PNLC) systems.

A liquid crystal cell comprises an active layer of liquid crystals (substantially and even solely), the liquid crystals having a predefined orientation or equilibrium direction. The liquid crystal cell is encapsulated between two supports (polymeric films or glass) which are kept at a constant distance by spacers (transparent, preferably punctual, 3D) such as glass or polymer balls (or cube or circular cylindrical base, etc.).

Examples of liquid crystal cells include those disclosed in patent applications JP2018141891 or EP3990981.

The liquid crystal cell may have at least one of the following cumulative or alternative technical features:

- the active layer contains not more than 5% or 1% or 0% polymer and polymer precursor in solution (excluding spacers)
- the liquid crystal cell is called a "guest host" (GH), and the active layer comprises at least one dichroic dye (the outer faces of the first interior and exterior supports are the outer faces of the "guest host" cell)
- or the liquid crystal cell is called TN (for twisted nematic) and comprises an upper (tinted) polarizer on an upper outer face of the upper support with electrode and a lower (tinted) polarizer on a lower outer face of the lower support with electrode (the outer faces of the polarizers are the outer faces of the cell), A photovoltaic device (transparent or opaque) can also be added between face F2 and face F3, a photovoltaic device between two interlayers of the lamination interlayer (PVB, etc.) in particular or above and even in contact with the first tinted layer (preferably interlayer).

This electrically controllable or photovoltaic device is, for example, completely or partially opposite or offset from the guided light extraction means, and preferably between face F2 and the first tinted layer (upper tinted interlayer, for example in particular PVB). The substrates of the electrically controllable device are, for example, non-adhesive films made of thermoplastic polymers such as PET.

In fact, between face F3 and the first tinted layer, it is preferable to avoid any metallic layer (electrode, etc.) (pure or nitrided, for example) or transparent conductive oxide, or even any layer with an extinction coefficient k, imaginary part of the complex refractive index, of at least 10-5 in the visible range (in particular at the reference wavelength, for example 550 nm and even over the spectral range of the source).

The laminated glazing according to the invention can therefore comprise at least one electrically controllable and/or photovoltaic device, preferably between (and even in contact with) the first tinted layer, which is preferably an interlayer (PVB) and an interlayer (clear or tinted PVB) closer to face F2 than the first tinted layer.

The laminated glazing according to the invention can alternatively or cumulatively comprise a non-adhesive functional film (polymer film—PET for example—optionally with a preferably non-metallic functional coating) between (and even in contact with) the first tinted layer, which is for example an interlayer (PVB), and face F3 and even between (and even in contact with) the first tinted layer (interlayer, preferably PVB-based) and an interlayer (preferably PVB-based) on face F3.

The laminated glazing according to the invention may also comprise a layer that reflects or absorbs infrared, on face F2 or on a transparent polymer film (PET, etc.) between two intermediate layers, in particular a stack of thin layers referred to as low-emissivity thin layers comprising at least one metal layer such as silver (and even 2 or 3 or 4), the or each silver layer being arranged between dielectric layers. In this configuration, the first tinted layer (preferably an interlayer) is closer to face F3 than this low-emissivity stack, and the first glass sheet is clear, even any layer (interlayer, etc.) between face F3 and the low-emissivity stack.

More generally, between the first tinted layer and face F3, it is preferable to avoid any metallic layer (pure or nitrided, for example) or transparent conductive oxide, having an extinction coefficient k, imaginary part of the complex refractive index, of at least 10-5 in the visible range (in particular at the reference wavelength, for example 550 nm and even over the spectral range of the source), The lamination interlayer can be single-layer or multi-layer (in particular multi-layer, two, three or four adhesive layers, in particular adhesive films or laminae. The interfaces between layers (lamina) are not necessarily discernible. The lamination interlayer can incorporate one or more elements (non-adhesive to the glass) such as functional polymer films or electro-optical elements, sensors, of various extents (all or part of the glazing). For example, two PVB laminae in a PVB/polymer film stack that is not adhesive with the glass/PVB, etc.

It is also preferable for a lamination interlayer to be selected with as little haze as possible, i.e. of at most 1.5% and even of at most 1%.

Preferably, the lamination interlayer comprises one or more polymer sheets (lower interlayer, upper interlayer, etc.). The polymers are chosen from polyvinyl butyral (PVB), polyurethanes (PU), in particular TPU, and ethylene vinyl acetate (EVA), in particular thermoplastic or cross-linked. The lamination interlayer, the intermediate layer(s)

may comprise polymer sheets such as polyureas, polyolefins (including polyethylene (PE), polypropylene (PP) or polyisobutylene (P-IB)), polyvinyl chloride and its derivatives (for example, polyvinyl dichloride (PVDC)), styrenic polymers (for example, polystyrene (PS), acrylostyrene butadiene (ABS), styrene acrylonitrile (SAN)), polyacrylics (including polyacrylonitrile (PAN) and poly(methyl methacrylate) (PMMA)), polyesters (including poly(ethylene terephthalate) (PET) and poly(butylene terephthalate) (PBT)), polyoxymethylene (POM), polyamides (PA), fluoropolymers such as polychlorotrifluoroethylene (PCTFE), polycarbonates (PC), aromatic polysulfones including polysulfone (PSU), polyphenylene ethers (PPE), epoxies (EP) alone or in blends and/or copolymers of several of these.

The lamination interlayer can be at least one sheet based on PVB or PU (flexible) or thermoplastic without plasticizer (ethylene copolymer/vinyl acetate (EVA), etc.), with each sheet being, for example between 0.2 mm and 1.1 mm thick, particularly 0.38 and 0.76 mm.

Preferably, any PVB-based interlayer (in lamina form) comprises from 70% to 75% PVB, 25 to 30% plasticizer and less than 1% additives. There are also PVB laminae with little or no plasticizer such as the "MOWITAL LP BF" film from KURARAY without plasticizers. Thus, the lamination interlayer can be or can comprise a sheet based on (made of) poly(vinyl butyral) (PVB) containing less than 15% by weight of plasticizers, preferably less than 10% and better still less than 5% by weight, and in particular without plasticizer, and particularly at most 0.15 mm thick, in particular from 25 to 100 μm, 40 to 70 μm, and even 50 μm, for example the product called Kuraray Mowital®.

The lamination interlayer can be acoustic, in particular it can comprise or consist of an acoustic PVB (three-layer, four-layer, etc.). Thus, the lamination interlayer can comprise at least one layer, called central layer, made of viscoelastic plastic with vibro-acoustic damping properties, particularly based on polyvinyl butyral and plasticizer, and the interlayer, and further comprising two external layers made of standard PVB, with the central layer being between the two external layers. Mention may be made of the acoustic PVBs described in patent applications WO2012/025685, WO2013/175101, especially tinted as in WO2015079159.

The first glass sheet and the second (mineral) glass sheet preferably can be curved (by using the curving methods known to a person skilled in the art). The curved glazing is generally curved in two directions.

The mineral glass sheet can be produced by the float process, enabling a perfectly flat and smooth sheet to be obtained, or produced by drawing or rolling processes.

The tin face of the second mineral glass sheet can be either face F3 or face F4. The tin face of the first glass sheet can be either face F1 or face F2.

By way of examples of glass, float glass with a conventional soda-lime composition, optionally thermally or chemically hardened or tempered, an aluminum or sodium borosilicate or any other composition can be cited.

In one embodiment, the glazing comprises an internal, peripheral, opaque masking layer between face F3 and face F2, and even covering the periphery of the optical protection layer, notably an internal masking layer in contact with face F2 coating on face F2 or on an interlayer in contact with face F2), notably defining the clear glass area. And/or the glazing may comprise an interior opaque peripheral masking layer on face F4, in particular congruent with or narrower than the width of the internal masking layer.

The inner opaque peripheral masking layer is in particular an enamel (black, etc.) on face F2. This can be an opaque coating on a thermoplastic adhesive layer, in particular additional upper interlayer, in particular PVB, for example an opaque PVB-based coating with coloring agent on one main face of a PVB layer face oriented toward face F2 or F3.

The internal masking layer can be 2 mm or 3 mm (less than 1 cm or 5 mm) from the edge face of the glazing, or can even go up to the edge face. The internal masking layer can be a band framing the glazing (windshield, roof, etc.) particularly in black. Opacifying is carried out over the entire periphery to conceal bodywork elements or seals or to protect an adhesive for mounting on the vehicle. This internal masking layer can delimit the clear glass area. It may be advantageous for the external edge of the optical protection layer to be masked by the internal masking layer, not in the clear glass area.

The width of the internal masking layer along the sides of a motor vehicle roof is generally less than that at the front or even at the rear.

In particular, for a vehicle roof:

the width of the internal (and even interior) masking layer along the longitudinal edges can be at most 30 cm, in particular 10 to 20 cm, the width of the internal (and even interior) masking layer along the rear lateral edge can be at most 30 cm, in particular at least 1 or 5 cm, and along the front lateral edge at most 60 cm, in particular at least 1 or 5 cm.

The width of the internal masking layer is preferably greater than that of the interior masking layer.

The interior peripheral masking layer can be on face F4, in particular facing toward the internal masking layer (and even of identical nature, for example an enamel, particularly a black enamel, on the second sheet made of mineral glass). The interior masking layer can be 2 mm or 3 mm (less than 1 cm or 5 mm) from the edge face of the glazing, or can even go up to the edge face. The inner masking layer, particularly black, can be a band or even a frame. The inner masking layer may be adjacent to the optical protection layer (the protective coating), inner masking layer (in particular enamel, black, etc.) in contact (adjacent, under or over) or spaced apart, preferably by no more than 10 mm or 1 mm.

The internal and/or interior masking layer may be an organic or mineral binder (sintered glass frit) with an organic or inorganic coloring agent, in particular molecular dye or inorganic pigment.

The internal and/or interior opaque masking layer is preferably a continuous layer (flattened with a solid edge or alternatively a gradient edge (set of patterns).

The thickness of the intermediate layer(s) between face F2 and face F3 is preferably at most 1.5 mm or 1.1 mm or 0.9 mm, and in particular the thickness of the lamination interlayer(s) is at most 1.1 mm or 0.9 mm. The thickness between face F1 and face F4 is preferably at most 9 mm or 7 mm, in particular for a road vehicle.

The first sheet is made of mineral glass, optionally tempered. In particular for road glazing, the first (outer) sheet is preferably at most 2.5 mm thick, even at most 2.2 mm thick—in particular 1.9 mm, 1.8 mm, 1.6 mm and 1.4 mm—or even at least 0.7 mm thick/

The second sheet can have a thickness of at least 0.7 mm, optionally less than that of the first exterior glass sheet, even by up to 2.2 mm—in particular 1.9 mm, 1.8 mm, 1.6 mm and 1.4 mm—or even by up to 1.3 mm or by up to 1 mm.

The total thickness of the first and second sheets of glass is preferably strictly less than 5 or 4 mm, even 3.7 mm.

The first and second glass sheets can be substantially identical in size, for example generally rectangular. The first sheet (if exterior) may be larger than the second sheet (if interior), thus protruding beyond this second sheet over at least part of the periphery thereof, thus optionally second sheet (passenger compartment side) that is smaller with an edge face that is recessed, in particular by at most 10 or 5 cm, from the edge face of the first glass sheet, on one edge or several (longitudinal and/or lateral) edges in particular or over the entire periphery.

The first sheet may be a clear glass with a functional athermal or even heating coating on face F2.

The first mineral glass sheet may be based on silica, soda-lime, preferably soda-lime-silica, or even aluminosilicate or borosilicate. It may have a total iron oxide content by weight (expressed in the form $Fe_2O_3$) of at least 0.4% and preferably of at most 1.5%.

The second mineral glass sheet may be based on silica, soda-lime, soda-lime-silica, aluminosilicate or borosilicate. To limit the absorption has a total iron oxide content by weight (expressed in the form $Fe_2O_3$) of at most 0.05% (500 ppm), preferably of at most 0.03% (300 ppm) and of at most 0.015% (150 ppm) and particularly greater than or equal to 0.005%. The redox of the second glass sheet is preferably greater than or equal to 0.15.

In the present text, the light transmission is calculated from the transmission spectrum between 380 and 780 nm, taking into account the illuminant A and the CIE 1964 standard observer (10°).

The light transmission and the tint of each of the glass sheets are adjusted by virtue of the chemical composition of the glass and the thickness of the glass sheet. The chemical composition of the glass comprises a colorless base, preferably soda-lime-silica base (but other glasses can be used, in particular borosilicate or aluminosilicate glasses), as well as a coloring part. The coloring part in particular comprises one or more dyes chosen from transition metal oxides—in particular iron oxides (ferrous and ferric oxides), cobalt oxide, chromium oxide, nickel oxide, rare earth oxides, in particular erbium oxide, and selenium.

The first sheet of tinted glass is a glass sheet having for example a light transmission between 50 and 80%, in particular between 60 and 75%. It comprises a coloring part, for example composed of iron oxides, in a total content of between 0.4 and 1.2% by weight, in particular between 0.6 and 1.1% by weight. The glasses obtained are then green, optionally green-yellow or green-blue according to the proportion of ferrous iron. According to other examples, cobalt oxide, selenium and/or erbium oxide are added in order to confer a tint, for example blue or gray.

Better still, the first sheet of tinted glass is a glass sheet having for example a light transmission between 5 and 50%, in particular between 8 and 40% and even at most 20%. It comprises a coloring part, for example composed of iron oxides, in a total content of between 1.0 and 2.3 by weight, in particular between 1.1 and 2.0% by weight, as well as cobalt and chromium oxides and/or selenium. The coloring part comprises, for instance, the following dyes, in the weighted proportions defined hereinafter: $Fe_2O_3$ (total iron) from 1.2 to 2.3%, in particular from 1.5 to 2.2%, CoO from 50 to 400 ppm, in particular from 200 to 350 ppm, Se from 0 to 35 ppm, in particular from 10 to 30 ppm. The redox is preferably between 0.1 and 0.4, in particular between 0.2 and 0.3. Redox is the weight ratio of the content of ferrous iron (expressed as FeO) to the total iron content (expressed as $Fe_2O_3$). The glasses obtained are in particular green or gray.

The second sheet can be made of organic glass, in particular polyurethane (PU), polycarbonate (PC), poly(methyl methacrylate) (PMMA) or poly(vinyl chloride) (PVC).

The second organic glass sheet can be flexible to follow the curvature of the first curved sheet, or the second organic glass sheet can be preformed.

With an organic glass such as PC or PMMA, thermoplastic polyurethane (TPU) or else a crosslinked polymer material is preferable (for more chemical compatibility) to PVB as lower interlayer. It is also possible to choose thermoplastic or thermoset EVA.

In the present invention, the expression "tempered glass" means thermally tempered glass in the absence of any precision, and preferably glass tempered during an operation of bending the glass.

The second glass sheet is a clear (or extra clear) sheet having for example a light transmission of at least 85%, or even of at least 90%. It generally does not comprise a coloring part except for inevitable impurities, in particular iron oxides, in a total content of between 0.005 and 0.200% by weight, in particular between 0.010 and 0.150% by weight, or even between 0.030 and 0.120% by weight.

The second glass sheet may (depending on the esthetic rendering, the desired optical effect, the purpose of the glazing, etc.) be a clear glass (for example light transmission TL higher than or equal to 90% for a thickness of 4 mm), for example a glass of standard soda-lime composition such as Planilux® from Saint-Gobain Glass, and even an extra-clear glass (for example TL higher than or equal to 91.5% for a thickness of 4 mm), for example a soda-lime-silica glass with less than 0.05% Fe Ill or $Fe_2O_3$ such as the glass Diamant® from Saint-Gobain Glass, or the glass Optiwhite® from Pilkington or the glass B270® from Schott, or a glass of another composition described in document WO04/025334.

The glass of the first glass sheet may have undergone chemical or thermal treatment such as hardening, annealing or tempering (for improved mechanical strength in particular) or bending, and is generally obtained using the float process.

The luminous glazing can have non-zero light transmission TL in all or part of the clear glass area (generally surrounded by a masking layer). For a glazing which is a roof, non-zero light transmission TL is preferred, and even of at least 0.5% or of at least 2% and of at most 10% and even of at most 8%.

The second glass sheet can alternatively be made of organic glass (preferably rigid, semi-rigid) such as a polymethyl methacrylate (PMMA), preferably with a lamination interlayer (PU), a polycarbonate (PC), preferably with a PVB lamination interlayer.

In particular, the following can be selected as a first glass sheet/lamination interlayer/second glass sheet:

mineral glass/PVB (acoustic, etc.)/mineral glass, even mineral glass/lamination interlayer/polycarbonate, For guidance, the second mineral glass sheet is preferably clear or even extra-clear, or made of clear or even extra-clear organic glass.

For thermal applications, the first glass sheet (or other layer) is tinted and preferably over-tinted.

Preferably, the first tinted layer and the intermediate layer(s) below the first tinted layer have an extinction coefficient k, imaginary part of the complex refractive index, of at most 10-6 or 10-7 in the visible range (particularly at the reference wavelength, for example 550 nm, and even over the spectral range of the source).

The (visible) light source is preferably:

a set of light-emitting diodes (on a first printed circuit support such as a PCB, for "printed circuit board"), in particular a strip, or light source which comprises an extracting optical fiber coupled with a primary light source (light-emitting diode(s), etc.), The diodes can be (pre) assembled on one or more PCB support(s) (Printed Circuit Board) or supports with electrical power supply tracks, with these PCB supports being able to be attached to other supports (profiles, etc.). The PCB support is generally thin, in particular less than or equal to 3 mm, or even 1 mm, or even 0.1 mm, or, where applicable, less than the thickness of a lamination interlayer. Several PCB supports can be provided, particularly if the zones to be illuminated are very far apart. The PCB support can be made of a flexible, dielectric or electrically conductive material (metal such as aluminum, etc.), or be composite, plastic, etc.

Preferably, the light source is peripheral, in particular located on part of the glazing located inside the trim of the vehicle, the essential function of which is to keep it out of sight from vehicle passengers, as well as to protect it from dust and external influences.

The light source (diodes, etc.) can be spaced apart from the second glass sheet or glued, for example, to the edge or bonded to face F4 at the periphery.

The luminous zone is intended for the inside of the passenger compartment (in the case of a roof, in particular, or for signaling, information for the driver or for any other passenger).

The glazing can comprise a plurality of light sources, particularly light-emitting diodes. Of course, several light sources (one or more series of diodes) can be coupled to the second sheet.

Light injection from the light source optically coupled to the second sheet, preferably a set of light-emitting diodes, is for example:

by an edge face of the second glass sheet, possibly with a notch or by a wall delimiting a closed hole of the second glass sheet, in particular hole offset from a clear glass area, facing an internal masking layer, or by a light redirecting element, local such as an optical redirecting film, on face F3 or face F4 side, the light source then facing or being offset from face F4, in particular direct optical coupling or by means of an optical system, in particular light source and light redirecting element offset from a clear glass area, facing an internal masking layer.

The extraction (scattering) zone is for example at least 0.5 mm wide, or less than 1 mm, or even at least 1 cm, and even at least 5 cm (with the width naturally being distinguished from the thickness), a full zone and/or comprising a set of discontinuous designs (discrete, point (3D), for example geometrical, linear (2D), particularly distinct or identical, for example spaced apart by at least 0.5 mm), the scattering zone being able to occupy a surface that preferably is greater than 5 cm, and even greater than 10 cm long.

The scattering zone can occupy at least 60%, 70%, 80%, 90% of the main face of the glazing, preferably spaced from the optical coupling by at least 20 mm.

The luminous glazing may comprise a plurality of scattering zones having identical or different sizes and/or shapes. The extraction zone may cover part or all of the laminated glazed unit depending on the lighting or the desired effect (in the form of strips disposed on the periphery of one of the faces in order to form a luminous frame, logos or designs, etc.).

The scattering zone may be in a plurality of zones, for example each with identical or different, continuous or discontinuous designs, and can be any geometrical shape (rectangular, square, triangular, circular, oval, etc.), and can form a drawing, a sign (arrow, letter, etc.).

The luminous glazing can comprise a plurality of light extraction zones (scattering layers) in order to form a plurality of luminous zones on the glazing.

For example, the light extraction means comprise:

texturing of the second sheet, face F3 or face F4, even in contact with the overlying optical protection layer or an extractor film on the second sheet, face F3 or on face F4 and in contact with the overlying optical protection layer or a scattering layer comprising a binder and scattering particles and/or pores, on the second sheet, face F3 or face F4 and in contact with the overlying optical protection layer or a local scattering zone in the second sheet, including scattering particles and/or pores, or laser etching.

In particular, the guided light extraction means include (or consist of) a scattering layer comprising scattering elements in a matrix. (organic or mineral, for example enamel) to form a scattering zone (luminous in the on state).

The scattering elements preferably comprise, and even substantially consist of, particles (dielectric, organic or mineral, for example metal oxides) scattered and connected by the matrix, with particle size being at most 30 μm or at most 10 μm. The particles are selected, for example, from among particles of $TiO_2$, $SiO_2$, $CaCO_3$, ZnO, $Al_2O_3$, $ZrO_2$.

The scattering layer can be located directly on the main face FB of the lamination interlayer. The other main face of the lamination interlayer (in adhesive contact with a glass sheet) can be bare or coated, in particular on the periphery, with a masking layer (black ink, etc.).

The thickness of the scattering layer can be at most 20 μm, and even at most 10 μm, and even at least 1 μm.

The scattering layer is, for example, a transparent coating, while the matrix being organic and transparent. The transparent matrix, particularly deposited by the liquid route, can be made of a material selected from among a polymeric binder, such as a paint, in particular a lacquer, a resin. In particular, the transparent matrix can substantially consist of resin, particularly PVB resin. In particular, the transparent coating can comprise, and even substantially consist of, resin, particularly PVB resin, and of scattering elements, particularly scattering particles, particularly of at least 50 nm, 80 nm or 100 nm, and preferably of at most 30 μm or 10 μm or 1 μm. The transparent scattering coating can consist substantially of the resin and said scattering elements (particles and/or pores, etc.), in particular particles. The resin can be chemically compatible with the lamination interlayer, which is a PVB, for example. The resin can be a PVB resin with the lamination interlayer, which is a PVB.

The glazing is preferably a roof, which can be openable or fixed, or a vehicle door, a side window or a rear window.

The invention also relates to a road vehicle incorporating the previously defined glazing.

In the present application, a road vehicle is understood to be a car, particularly a commercial vehicle (van, small truck, dispatch van) weighing less than 3.5 tons (light utility vehicle), or even can be a truck or even a shuttle, small private or public transport vehicle. The side glazings can be in sliding doors. The luminous glazing can be in a rear door.

The present invention will be better understood and other details and advantageous features of the invention will become apparent upon reading the examples shown of the vehicle luminous glazings according to the invention.

FIG. 1 shows a schematic cross-sectional view of a laminated luminous roof for a motor vehicle according to the invention in a first embodiment FIG. 1' shows a schematic front view of the roof of FIG. 1

FIG. 1" shows a graph with three curves C1, C2, C3 indicating the minimum thickness E1 min based on n1

FIG. 6 shows a schematic sectional view of the glazing of FIG. 6.

Figure 1:
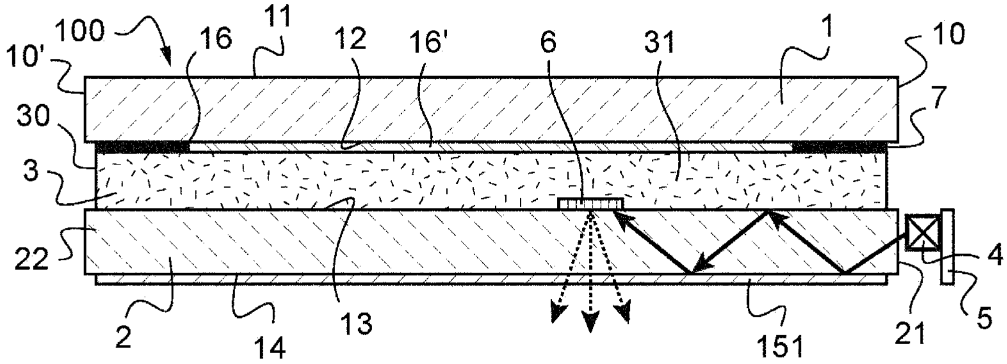
Figure 1:
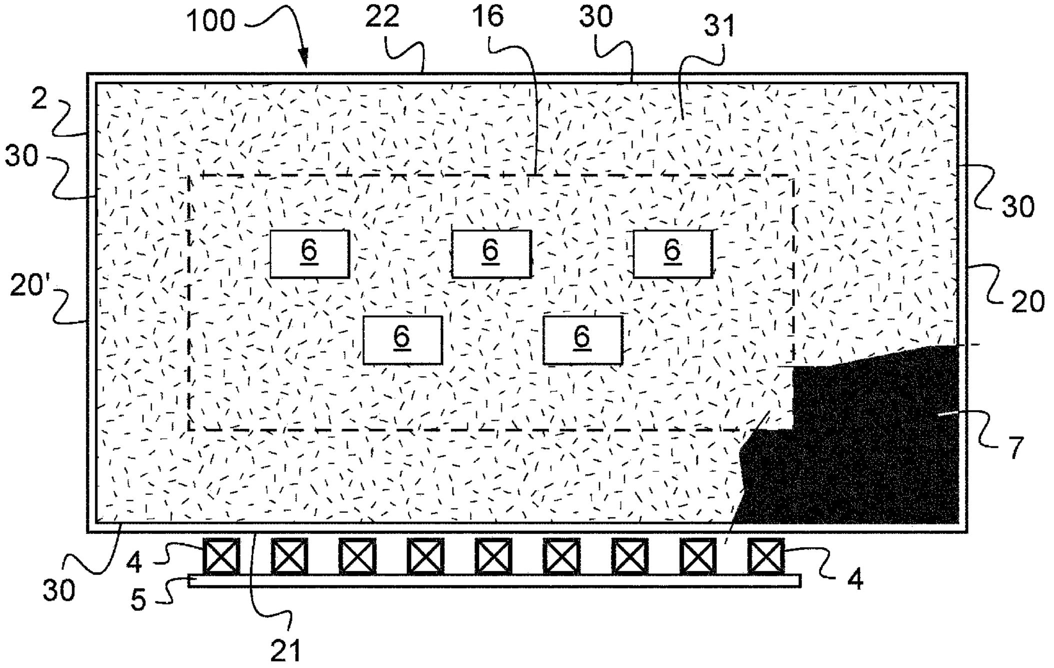

For the sake of clarity, it should be noted that the various elements of the objects that are shown are not necessarily reproduced to scale FIG. 1 shows a schematic sectional view, here lateral, of a luminous laminated vehicle roof 100 according to the invention in a first embodiment with peripheral illumination. FIG. 1' shows a schematic front view of roof of FIG. 1.

In this case, this is a laminated car roof 100 that is rectangular and is curved, which comprises:

- a first glass sheet 1, for example rectangular (dimensions 300×300 mm, for example), with a tinted composition (VENUS VG10 or TSA 4+ glass, sold by Saint-Gobain Glass) for example having a thickness equal to 2.1 mm, with a first main face 11 corresponding to face F1, a second main face 12 on the interior side referred to as face F2 and an edge surface (longitudinal edge faces 10 and 10'), face F2 being optionally coated with an athermal silver coating 16' or a heating coating (the glass 1 is then preferably clear), etc.,
- a second glass sheet, preferably mineral glass 2, with the same dimensions as the first sheet 1, forming internal glazing, on the passenger compartment side, made of mineral glass, having a third main face 11 corresponding to face F3 and a fourth main face 12 which is face F4, and an edge surface (longitudinal edge faces 21 and 22—for example a sheet of soda-lime-silica glass, extra-clear, such as Diamant glass sold by Saint-Gobain Glass, of thickness equal for example to 2.1 mm, glass of refractive index no on the order of 1.52 at 550 nm or 1.95 mm Optiwhite glass,
- between face F2 and face F3 an intermediate layer comprising at least one laminating interlayer 3, with a longitudinal edge 30 here possibly offset from the longitudinal edges 10, 10' towards the center of the glass (that is, recessed), a single layer (a single lamina) 31 of 0.76 mm clear or tinted PVB in adhesive contact with the athermal coating 16' (or with face F2 in its absence) and in adhesive contact with face F3 and of refractive index n2 in the visible with n2<n0.

The second face F2 comprises an internal masking layer 7 forming a masking frame a black enamel, delimiting a clear glass area 16 (daylight), in this case rectangular (see FIG. 1').

Light-emitting diodes 4 extend along the longitudinal coupling edge 21 of the second glass sheet 2. These are front-emitting diodes. Thus, these diodes 4 are aligned on a PCB support 5, for example a parallelepiped strip. The PCB carrier 5 is attached for example by adhesive 7 (or a double-sided adhesive) to the edge of the face.

Alternatively, the light source may be one or more primary sources (diodes, etc.) coupled directly to a guide, along the coupling edge face, for example extracting optical fibers with light output zone.

The luminous glazed unit 100 may have a plurality of extraction zones 6 for the guided light in the second sheet, in particular of given geometry (rectangular, square, round, etc.). For example, it is a scattering layer 6 (enamel, ink, screenprinting, etc.) which is a coating on the third face F3 and even alternately or cumulatively on the fourth face F4, scattering layer preferably in the clear glass area 16. Alternatively, it may be a local extractor film placed or bonded locally on the third face F3 or even fourth face F4 (with reliefs or with scattering layer or scattering in the bulk).

For example, the distance between the extraction 6 and the diodes is at least 10 or 40 mm. For example, the extraction occupies from 10 to 100% of the clear glass area, It is possible to provide several series of diodes 4 (one edge, two edges, three edges, over the entire periphery) controlled independently and even of different colors. White or colored light-emitting diodes can be selected for ambient lighting, reading, etc. A red light can be selected for signaling, possibly alternating with green light. The diode support 5 may be adhesively bonded to the edge face 21.

The light ray (after refraction on the edge face 21) propagates by total internal reflection (at face F3 and on face F4) in the second sheet 2 forming a light guide.

According to the invention, face F4 comprises an optical protection layer 151, with refractive index n1 in the visible range with n1<n2. It is a coating, deposited by any means (liquid, physical vapor (magnetron, etc.), chemical vapor, etc.) and of thickness E1.

FIG. 1" shows a graph with three curves C1, C2, C3 indicating the minimum thickness E1 min based on n1.

For a contaminating layer absorbing 100% of the light, the inventors then determined how to achieve a higher Rgm parameter with the optical protection layer, preferably of at least 95% or even 97% or 99%, denoting very low absorption and therefore better preservation of the guided mode in the sense of its total intensity.

Thus, E1 and n1 are chosen such that the optical protection layer has an Rgm parameter which is the guided mode reflection at the second interface between the sheet and the optical protection layer of at least 95%, preferably at least 97% and even at least 99%.

In one embodiment, simulations were performed and validated with n0=1.52, n2=1.485.

For Rgm of 95%, the thickness E1, in nm, is in a first delimited region of a graph of thickness E1 based on n1, with a first included lower limit E1a defined by a first curve C1 of thickness based on n1 of the following equation:

$$E1a(n1) = b1 - a_{11} * (n1 - n_{r1}) - a_{31} * (n1 - n_{r1})^3 - a_{51} * (n1 - n_{r1})^5$$

with $n_{r1}$=1.499; b1=122 nm; $a_{11}$=30.1 nm; $a_{31}$=−9.44*$10^{-3}$ nm; $a_{51}$=5.69*$10^{-6}$ nm And preferably, for Rgm of 97%, the thickness E1, in nm, is in a second delimited region of said graph (more restricted than the first region), with a second included lower limit E1b, defined by a second curve C2 (above C1) of the thickness based on n1 of the following equation $$E1b(n1) = b2 - a_{12} * (n1 - n_{r2}) - a_{32} * (n1 - n_r) - a_{52} * (n1 - n_{r2})^5$$

with $n_{r2}$=1.495; b2=154 nm; $a_{12}$=30.5 nm; $a_{32}$=−7.51*$10^{-3}$ nm; $a_{52}$=3.05*$10^{-6}$ nm And even more preferentially, for Rgm of 99%, the thickness E1, in nm, is in a third delimited region of said graph (more restricted than the first or second region), with a third included lower limit E1c, defined by a third curve C3 (above C1 and C2) of the thickness based on n1 of the following equation:

$$E1c(n1) = b3 - a_{13} * (n1 - n_{r3}) - a_{33} * (n1 - n_{r3})^3 - a_{53} * (n1 - n_{r3})^5$$

With $n_{r3}$=1.492; b3=211 nm; $a_{13}$=34.4 nm; $a_{33}$=−6.43*$10^{-3}$ nm; $a_{53}$=1.99*$10^{-6}$ nm And E1 is preferably no more than 3 μm or even no more than 1.5 μm.

If E1 of at most 1 μm is preferred, n1 of at least 1.466, 1.4685, 1.453, respectively, is needed. If E1 of at most 800 nm is preferred, n1 of at least 1.461, 1.453, 1.438, respectively, is needed. If E1 of at most 600 nm is preferred, n1 of at least 1.442, 1.43, 1.40, respectively, is needed.

If the thickness can be at least 1.2 μm (self-supporting film, liquid coating), n1 can be at least 1.472, 1.470, 1.461.

Above 1.3 μm, 1.6 μm, 2.2 μm, respectively, n1 is in the widest possible range as long as n1<n2.

For example, if a very thin optical protection layer is desired, one chooses n1=1.35 and E1=500 nm.

For example, if a thicker optical protection layer can be produced, n1 is chosen to be very close to n2 (at most around 1.46) and E1=1 μm, for example a porous silica sol-gel layer with no more than 10% pore volume.

Alternatively, an acrylate optical protection layer is chosen, for example with n1=1.4 with E1 from 600 nm or even 1 or 2 μm if this facilitates deposition. Ultra-thin clear glass can be bonded for mechanical protection.

An adhesive layer, in particular a cross-linked UV adhesive coating (LOCA) or PSA film, may also be chosen as optical protection layer 151. The adhesive layer is then in contact with ultra-thin clear glass.

Alternatively, the second sheet is made of organic glass, in particular polyurethane (PU), polycarbonate (PC), polyvinyl chloride (PVC) or poly(methyl methacrylate) (PMMA). With an organic glass such as PC or PMMA, thermoplastic polyurethane (TPU) or else a thermoplastic or thermoset EVA is preferable (for more chemical compatibility) to PVB as thermoplastic adhesive layer. We adjust n1 and E1 based on n2.

In all these examples, the optical protection layer fulfills the function of preventing dirt, fingerprints and dust. Any dust or fingerprints will not interact with the light and will therefore not light up when the light source is switched on. Even if the optical protection layer is in contact with the air, it is not necessary for n1 to be very low, close to 1, which is of course more difficult to achieve.

This luminous laminated glazing 100 can alternatively form a front windshield with internal signaling. The scattering layer forms, for example, an anti-collision signal in particular forming a strip along the lower longitudinal edge. For example, the light turns on (red) when a vehicle in front is too close.

This laminated luminous glazing 100 can alternatively form a front or rear quarter-glass or a door. The scattering layer 6, for example, forms an interior signage or decorative pattern, etc.

Figure 2:
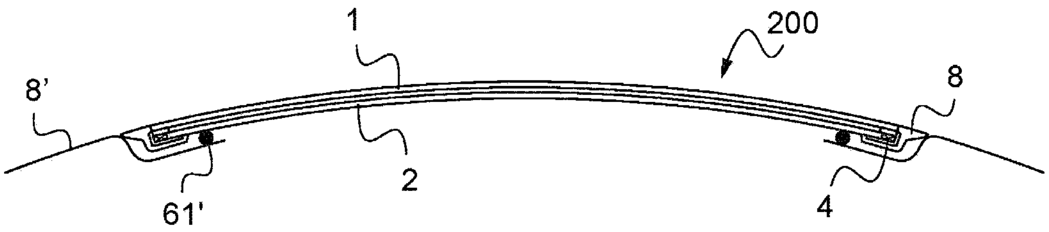
FIG. 2 shows a schematic sectional view of a luminous laminated motor vehicle glazing in a second embodiment by injection of peripheral light FIG. 2' shows a schematic sectional view of a luminous laminated motor vehicle glazing which is a roof mounted in a vehicle, like that of FIG. 2

FIG. 2 shows a schematic cross sectional view of a luminous laminated motor vehicle glazed unit 200 in a second embodiment by injection of peripheral light This second embodiment differs from the first embodiment in that side-emitting diodes 4 are housed in a recess (peripheral notch) of the edge face 21. Thus, these diodes 4 are aligned on a PCB 5 substrate, for example a parallelepiped strip, preferably as opaque as possible (non-transparent) and their emitting faces are parallel to the PCB substrate and facing the edge face 21 in the recessed edge face portion. The PCB substrate is attached for example by adhesive 5' (or a double-sided adhesive) on the edge face 121 of face F2 12, and here is engaged in a groove between faces F2 and F3 made possible by the sufficient removal of the edge face 30 of the interlayer 3. The peripheral masking strip 7 made of (black) opaque enamel can mask the PCB carrier 5 and even the outgoing light in this zone.

The distance of the diodes and the edge face 10 is minimized, for example from 1 to 2 mm. The space between each chip and the optically coupled edge face 10 can be protected from any pollution: water, chemical, etc., both in the long term and during the manufacture of the luminous glazed unit 100.

The luminous glazing 200 further has a polymeric encapsulation 8, for example made of black polyurethane, in particular of PU-RIM (reaction in molding). It is two-sided at the edge of the glazed unit. This encapsulation ensures long-term sealing (water, cleaning product, etc.). The encapsulation also provides a good aesthetic finish and makes it possible to integrate other elements or functions (reinforcing inserts, etc.). As described in document WO2011092419 or document WO2013017790, the polymeric encapsulation may have a through-recess closed by a removable cover to place or replace the diodes.

The roof 200 can for example form a fixed luminous panoramic roof of a motor vehicle, such as a car, mounted externally on the bodywork 8' via an adhesive 61' as shown in FIG. 2'.

Figure 3:
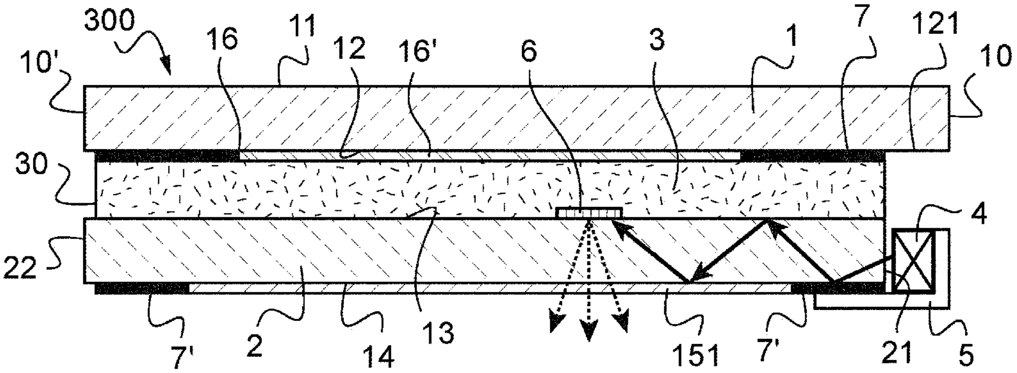
FIG. 3 shows a schematic sectional view of a luminous laminated motor vehicle glazing in a third embodiment with peripheral light injection

FIG. 3 shows a schematic cross sectional view of a luminous laminated motor vehicle glazing 300 in a third embodiment with peripheral light injection.

An interior peripheral masking layer 7' is on the fourth face F4 14, in particular narrower than the width of the internal masking layer 7. For example, a black enamel or black ink on an intermediate layer (interlayer, PVB, etc.).

Additionally, the diode carrier 5 is L-shaped with a part facing the fourth face F4 14. For example, the second sheet 2 is smaller than the first sheet 1, therefore the diodes are under the protruding part of the second face 121. The diodes are side-emitting or front-emitting diodes.

The optical protection layer 151 is adjacent to the inner masking layer 7' and optionally spaced from or in contact with the inner masking layer 7' with possible overlap.

Figure 4:
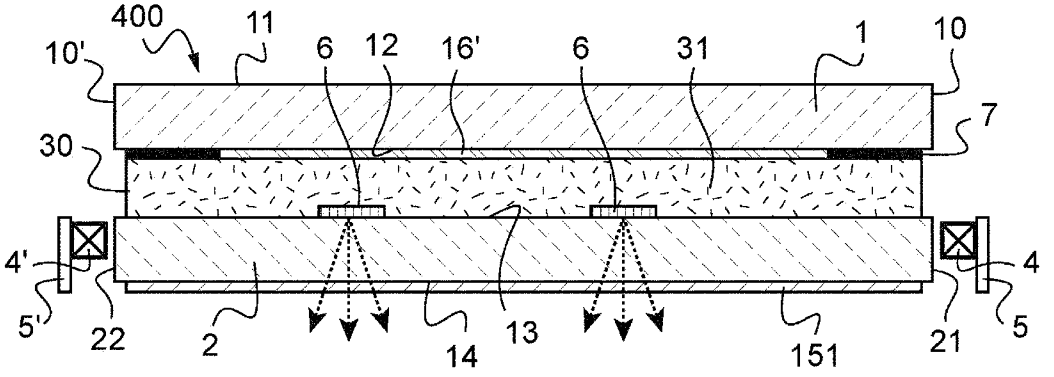
FIG. 4 shows a schematic sectional view of a luminous laminated motor vehicle glazing in a fourth embodiment by injection of peripheral light FIG. 4' shows a schematic front view of the glazing of FIG. 4
Figure 4:
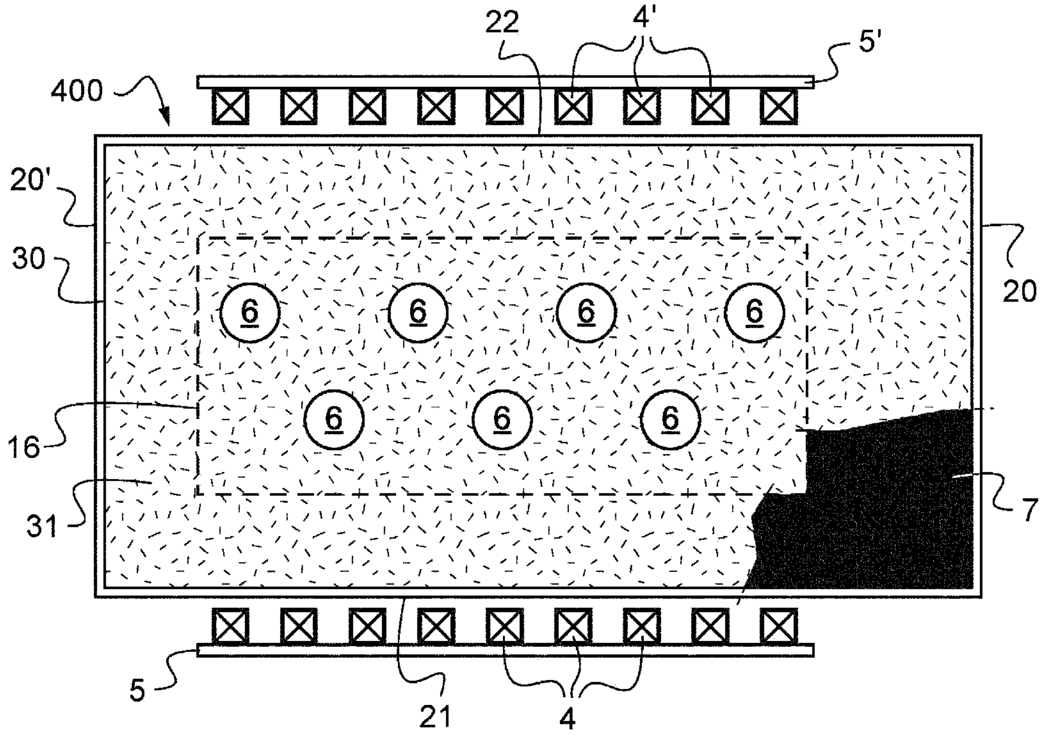

FIG. 4 shows a schematic cross sectional view of a luminous laminated motor vehicle glazing 400 in a fourth embodiment by injection of peripheral light. FIG. 4' shows a schematic front view of the glazing of FIG. 4.

This embodiment differs from the first embodiment in that a second diode module 4', 5' is added along the opposite longitudinal edge 22.

Figure 5:
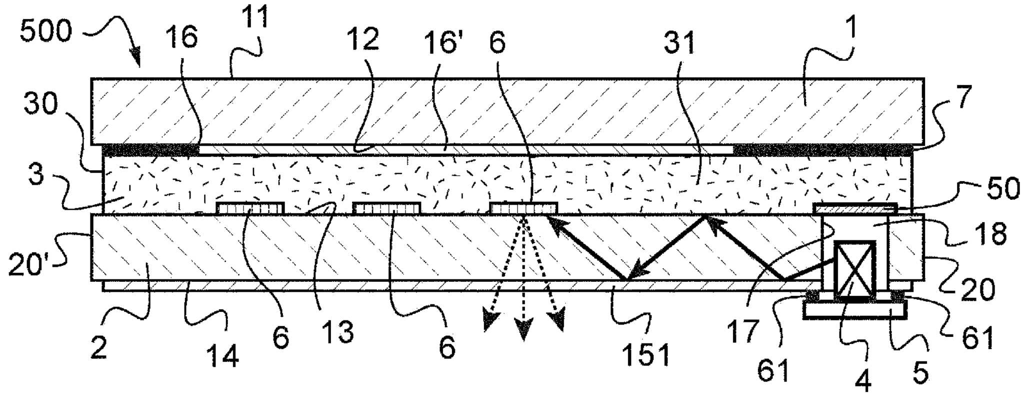
FIG. 5 shows a schematic sectional view of a luminous laminated motor vehicle glazing in a fifth embodiment by injection of light via an internal wall of the second perforated glass sheet FIG. 5' shows a schematic front view of the glazing of FIG. 5.
Figure 5:
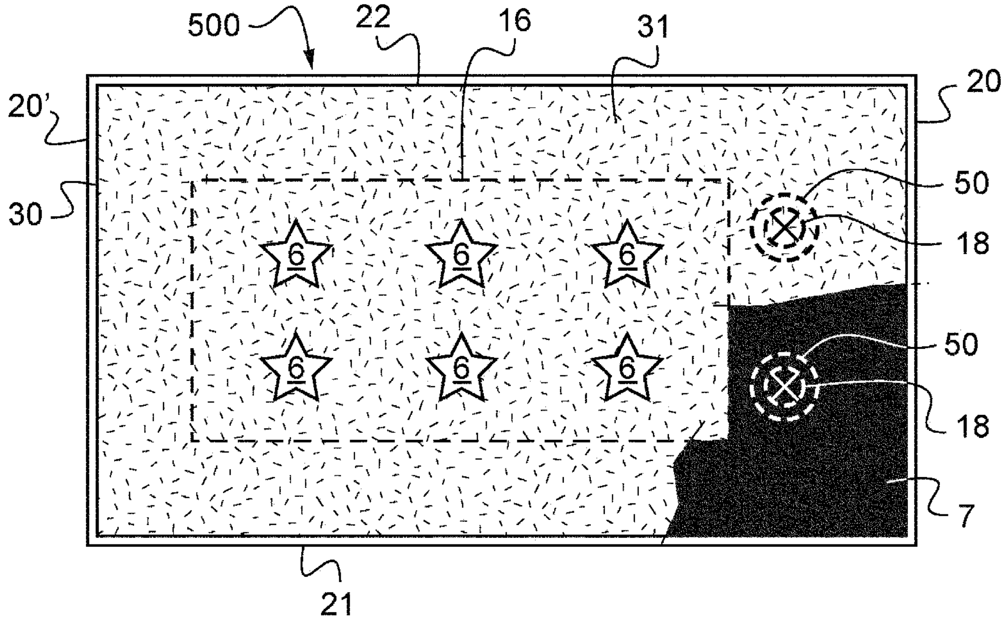

FIG. 5 shows a schematic cross sectional view of a luminous laminated motor vehicle glazing 500 in a fifth embodiment by injection of light via an internal glass wall. FIG. 5' shows a schematic front view of the glazing of FIG. 5.

This embodiment differs from the first embodiment 100 by the injection of light and the location of the light source 4.

Diodes 4 on a support 5 are in a through-hole 18 (offset from the clear glass area 16), of circular shape, of the second glass sheet 2 delimited by an internal wall 17 and closed by a cap 50 such as a metal sheet or any other optical shutter on the third face F3 13 side. The diode carrier 5 forms a cover adhesively bonded by an adhesive 61 to the fourth face F4 4.

And, as shown in FIG. 5', the means have been duplicated by adding further diodes 4 in another circular through-hole 18 (offset from the clear glass 16), closed by another cover 50. The holes here are on the side of the lateral front edge of the roof 20.

The internal masking layer 7 is often wider at the front than at the rear edge 20' side.

Figure 6:
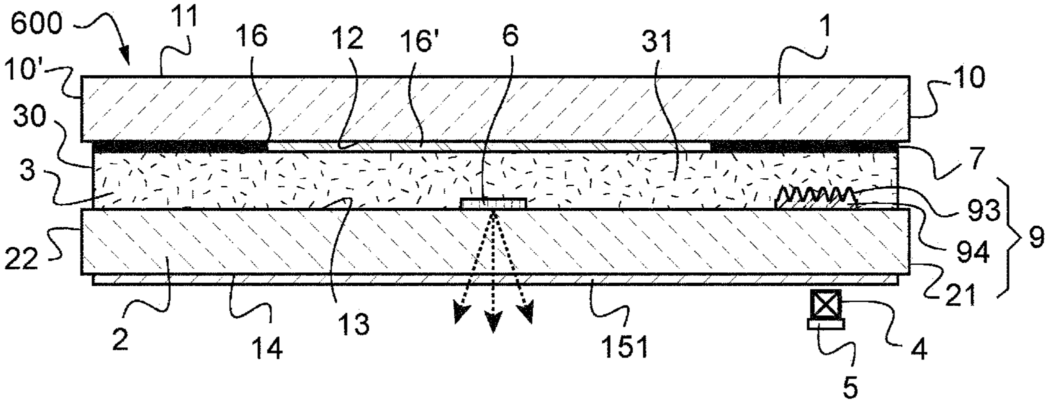
FIG. 6 shows a schematic sectional view of a luminous laminated motor vehicle glazing in a sixth embodiment by injection of light passing through the second sheet
Figure 6:
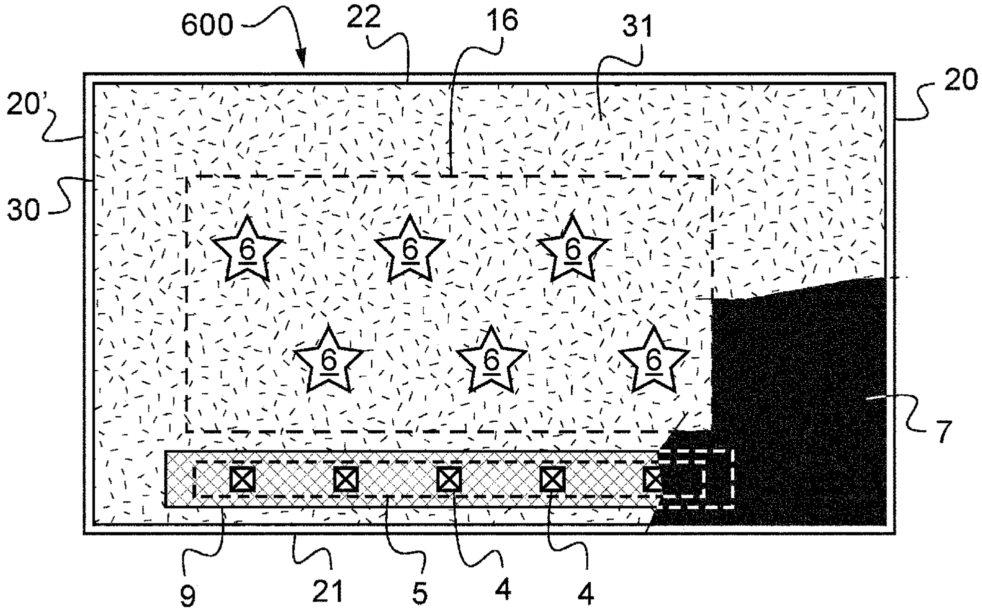

FIG. 6 shows a schematic cross sectional view of a luminous laminated motor vehicle glazing 600 in a sixth embodiment by injection of light passing through a glass. FIG. 6' shows a schematic front view of the glazing of FIG. 6.

This embodiment differs from the first embodiment 100 by the injection of light and the location of the light source 4.

Diodes 4 (here with front emission) on a support 5 are opposite (or offset from) the fourth main face 14 and the optical coupling with the second sheet 2 is done via a light redirecting element for local guidance, such as a reflective redirecting optical film 9, on the third main face F3 (or fourth main face F4) side for example facing the internal masking layer 7.

For example, it is a polymeric prismatic film with prisms 93 and a flat part 94 bonded or attached by suction to the third face F3 13 and having a thickness between 100 and 300 μm covered by the interlayer 31. The film forms a longitudinal strip, like the linear-type light source 4, along a longitudinal edge of the roof for example. The redirecting optical film 9 can also be alternately embedded in the interlayer 3, for example between a light-colored lower interlayer and a tinted interlayer. The prisms can be oriented towards face F3.

It is possible to double the means, therefore, by adding another light source, another redirecting film along the other longitudinal edge 10'.

In these glazing examples, an electroactive or photovoltaic device can be added, preferably between (and even in contact with) the first tinted layer, which is preferably an interlayer (PVB) and an interlayer (clear or tinted PVB) closer to face F2 than the first tinted layer.

Alternatively, or cumulatively, a non-adhesive functional film (polymeric film, for example PET, optionally with a preferably non-metallic functional coating) can be added beneath the first tinted layer, which is, for example, an interlayer (PVB).

The edge of the electroactive or photovoltaic device or functional film is preferably masked by the masking layer at F2.

The invention claimed is:

1. A laminated glazing for a vehicle, comprising:

a first transparent sheet, made of mineral glass, with a first main outer face and a second main inner face, a second transparent sheet, made of mineral or organic glass, with a third main face and a fourth main face called face, which second transparent sheet has a refractive index n0 in the visible range, between the second main inner face and the third main face, one or more dielectric, transparent intermediate layers with given refractive indices in the visible range, comprising a polymer lamination interlayer, the first transparent sheet being tinted and/or a first layer of the one or more dielectric transparent intermediate layers being tinted, wherein when several intermediate layers are tinted, the first tinted layer is the tinted layer closest to the third main face, n2 being the lowest refractive index among the refractive indices of the intermediate layers between the third main face and up to and including the first tinted layer, or up to the second main inner face in the absence of a tinted intermediate layer, with $n2<n0$, means for extracting guided light in the second transparent sheet, on the fourth main face, a transparent, dielectric, optical protection layer with refractive index n1 in the visible range with $n1<n2$ and thickness E1 of at least 100 nm and submillimeter.

2. The vehicle glazing according to claim 1, wherein a difference n2-n1 is greater than 0.02.

3. The vehicle glazing according to claim 2, wherein the difference n2−n1 is less than 0.3.

4. The glazing according to claim 1, wherein n2−n1 is less than 0.15.

5. The vehicle glazing according to claim 1, wherein n1 is greater than or equal to 1.3 or 1.4, and n0 is at least 1.5 and E1 is at least 250 nm.

6. The vehicle glazing according to claim 1, wherein the thickness E1 is in a first delimited region of a graph of thickness E1, in nm, based on n1, with a first included lower limit Ela defined by a first curve C1 of thickness based on n1 of the following equation:

$$E1a(n1) = b1 - a_{11} * (n1 - n_{r1}) - a_{31} * (n1 - n_{r1})^3 - a_{51} * (n1 - n_{r1})^5$$

with $n_{r1}=1.499$; $b1=122$ nm; $a_{11}=30.1$ nm; $a_{31}=-9.44*10^{-3}$ nm; $a_{51}=5.69*10^{-6}$ nm.

7. The vehicle glazing according to claim 6, wherein the thickness E1 is at most 3 μm.

8. The vehicle glazing according to claim 1, wherein the optical protection layer comprises a protective coating on the fourth main face.

9. The vehicle glazing according to claim 8, wherein the second transparent sheet is a mineral glass sheet and wherein the protective coating is mineral and on the mineral glass sheet, with E1 at most 1.5 μm.

10. The vehicle glazing according to claim 8, wherein the protective coating comprises a layer based on porous silica, optionally with an underlayer of dense silica.

11. The vehicle glazing according to claim 8, wherein the protective coating comprises a porous silica-based layer with a porosity of less than 20% or 10% by volume.

12. The vehicle glazing according to claim 1, wherein the optical protection layer comprises an organic or hybrid organic mineral layer.

13. The vehicle glazing according to claim 1, wherein the optical protection layer comprises an adhesive layer, made of cross-linked polymer material, on the fourth main face, in contact with a main inner face of a transparent film.

14. The vehicle glazing according to claim 13, wherein the optical protection layer comprises an adhesive film.

15. The glazing for a vehicle according to claim 1, wherein the means for extracting guided light comprise:

texturing of the second transparent sheet, on the third main face or the fourth main face, and in contact with the overlying optical protection layer, or an extractor film on the second transparent sheet, on the third main face or on the fourth main face and in contact with the overlying optical protection layer, or a scattering layer comprising a binder and scattering particles and/or pores, on the second transparent sheet, on the third main face or the fourth main face, or a local scattering zone in the second transparent sheet, including scattering particles and/or pores, or laser etching.

16. The vehicle glazing according to claim 1, wherein the first tinted layer is an interlayer, in particular based on PVB.

17. The vehicle glazing according to claim 1, comprising an electrically controllable or photovoltaic device between the second main inner face and the third main face and/or a transparent functional polymer film between the first tinted layer and the third main face, optionally between the first tinted interlayer and an interlayer on the third main face.

18. The vehicle glazing according to claim 1, wherein the vehicle glazing is a roof, a door glazing, or a side glazing.

19. A vehicle comprising at least one glazing according to claim 1.

20. The vehicle glazing according to claim 1, further comprising a light source in optical coupling with the second transparent sheet that forms a light guide.

* * * * *